March 26, 1929.     L. OLDFIELD ET AL     1,706,983
MOTOR VEHICLE
Filed June 13, 1925     8 Sheets-Sheet 6
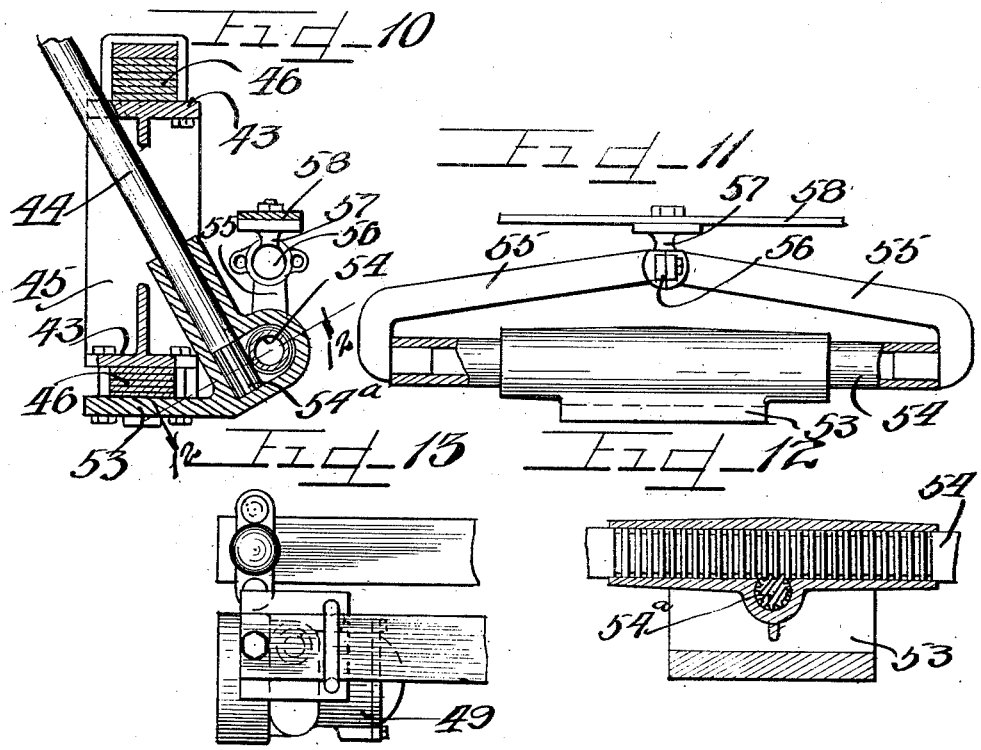
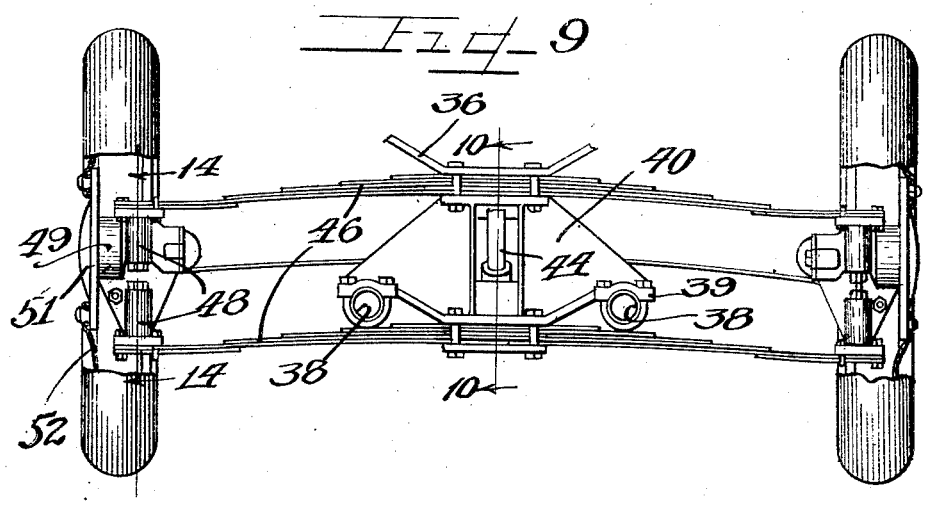
Inventors
Lee Oldfield
Charles Reed Rowlson
by [signature] Attys.

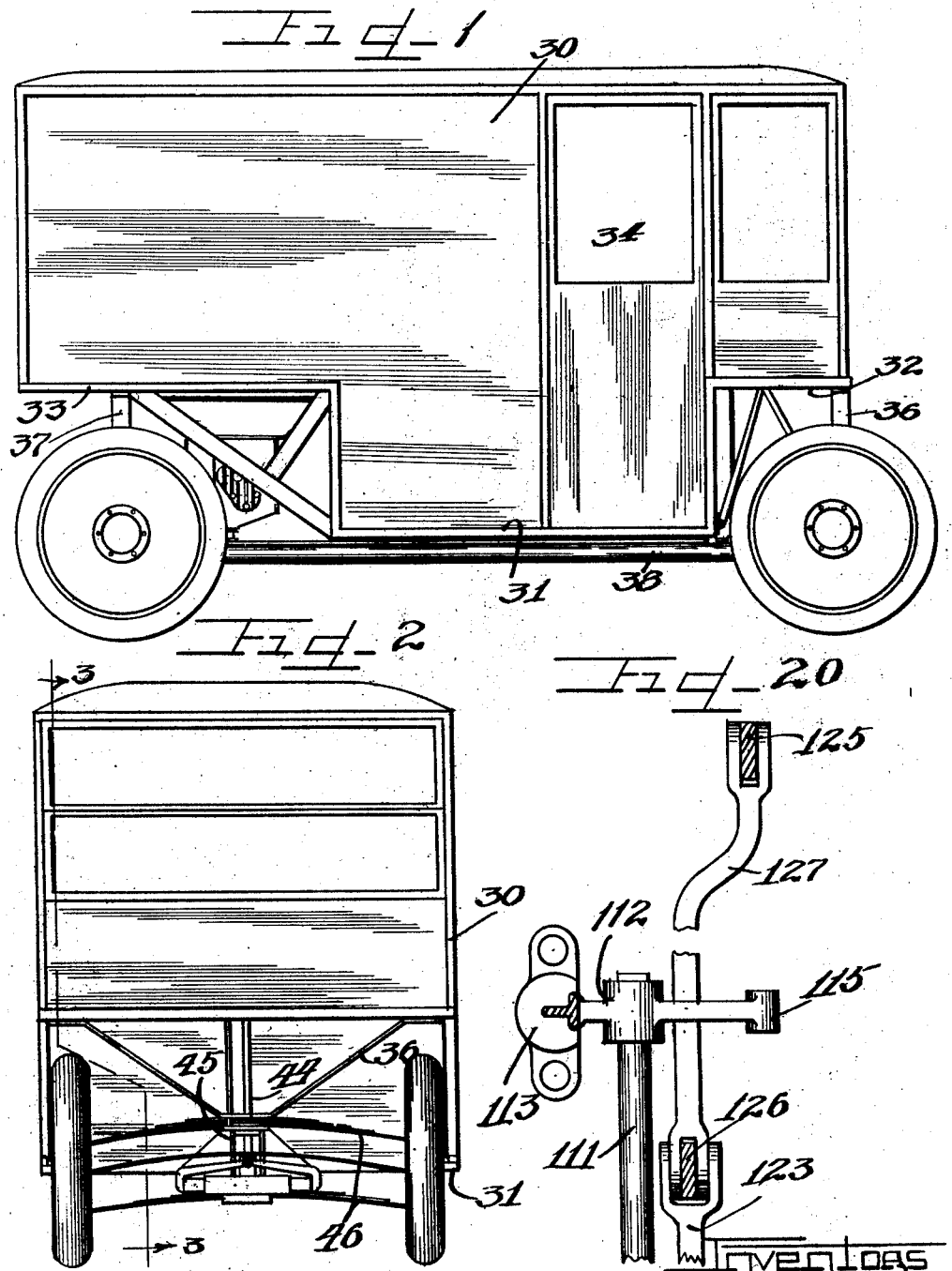

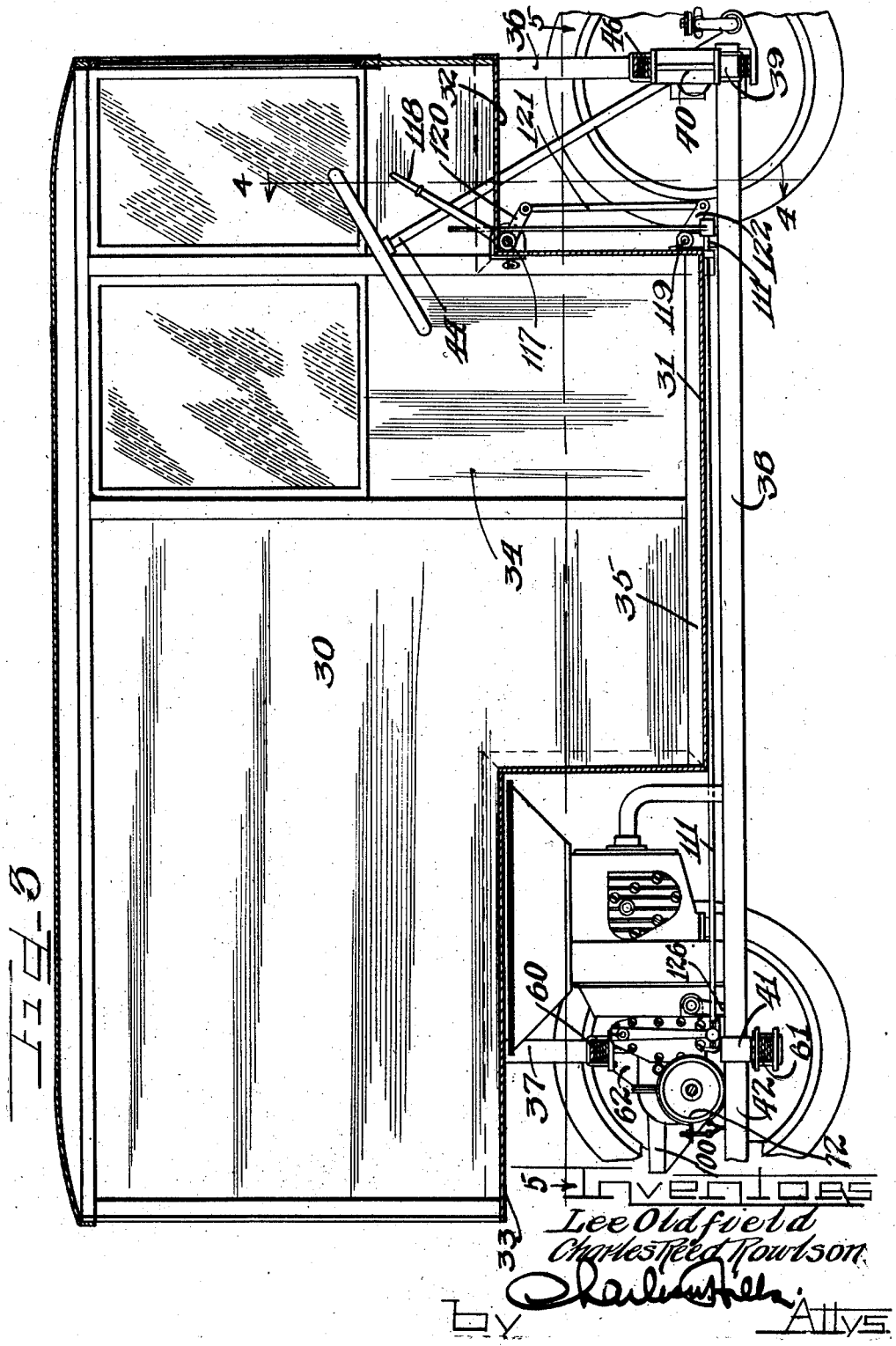

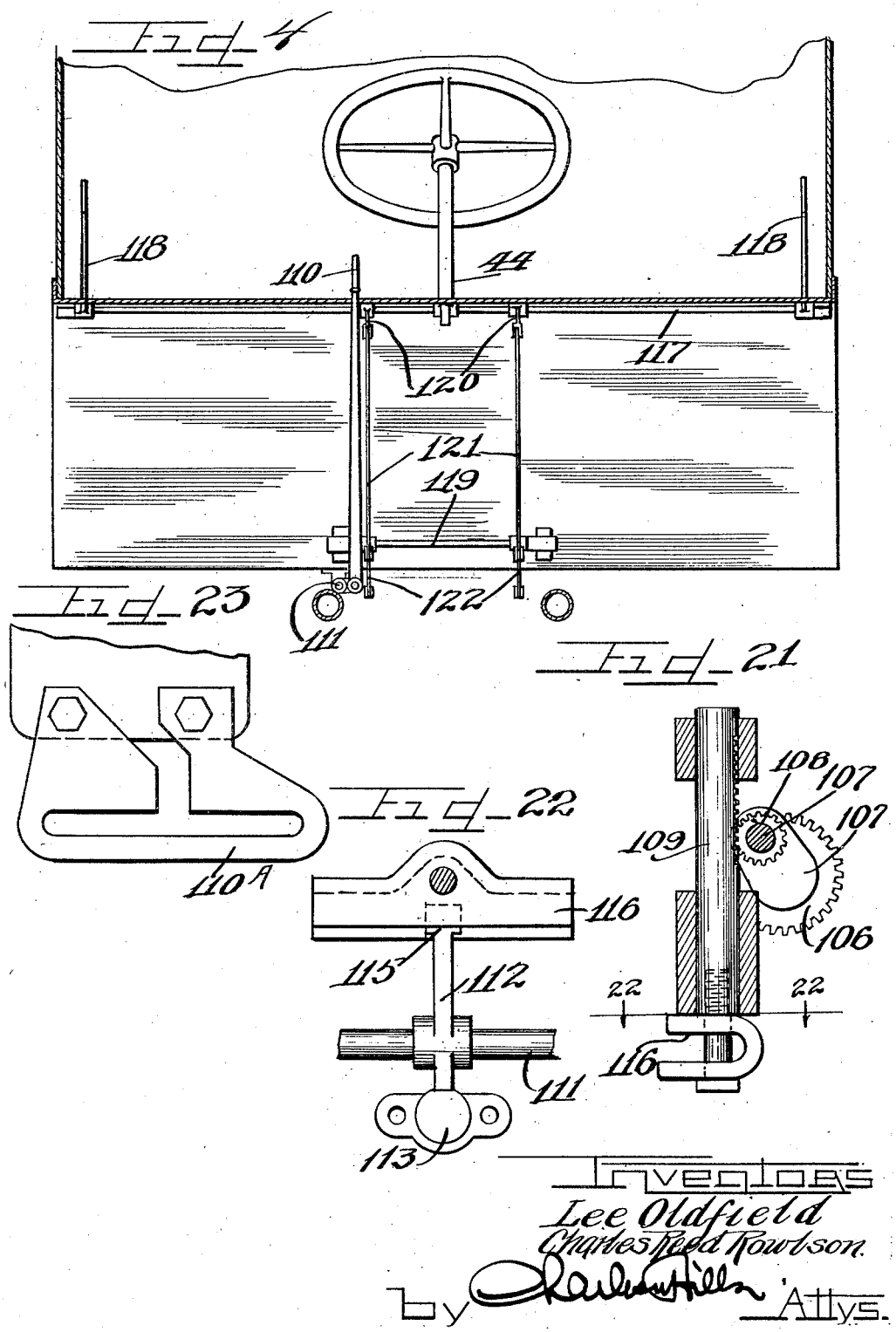

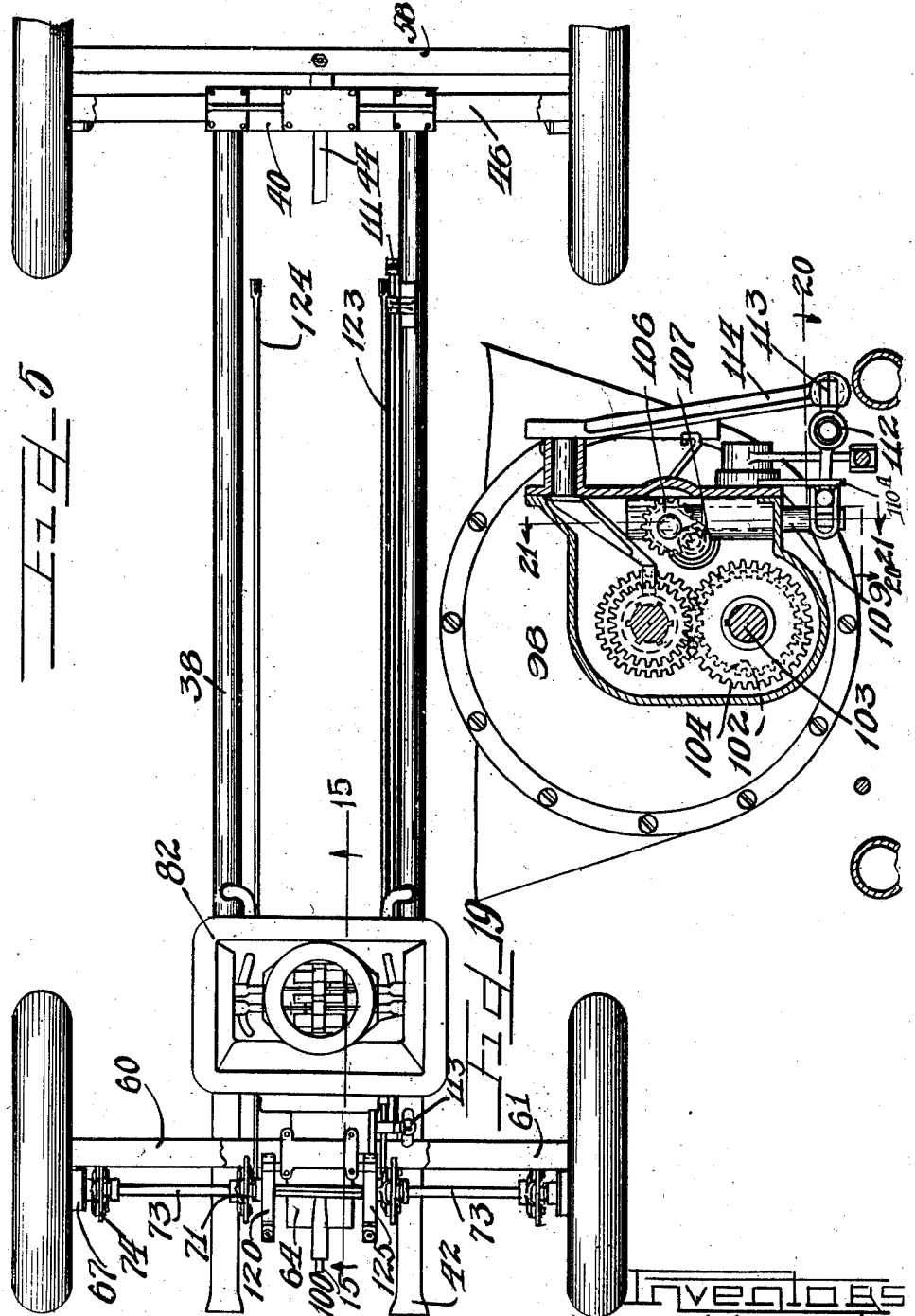

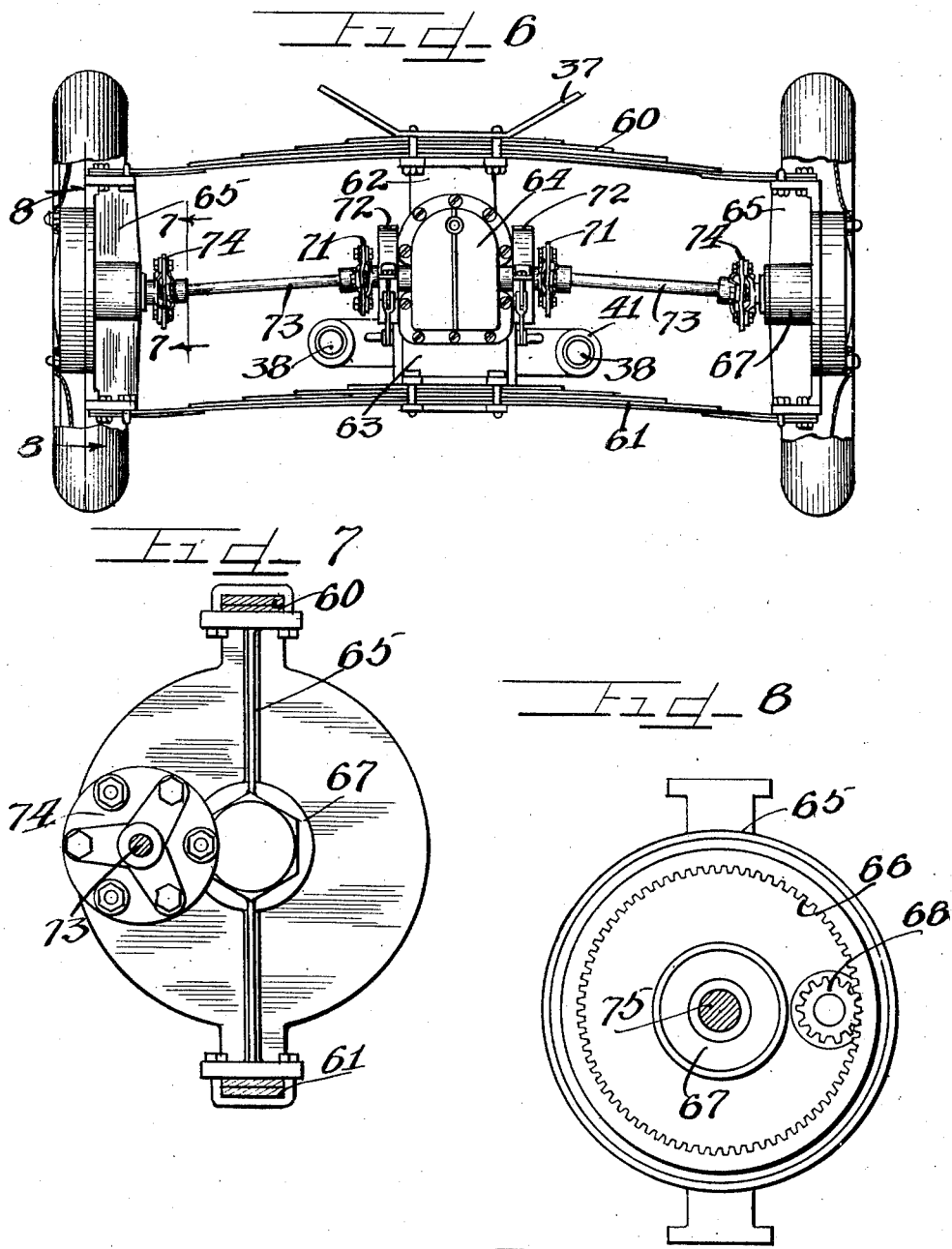

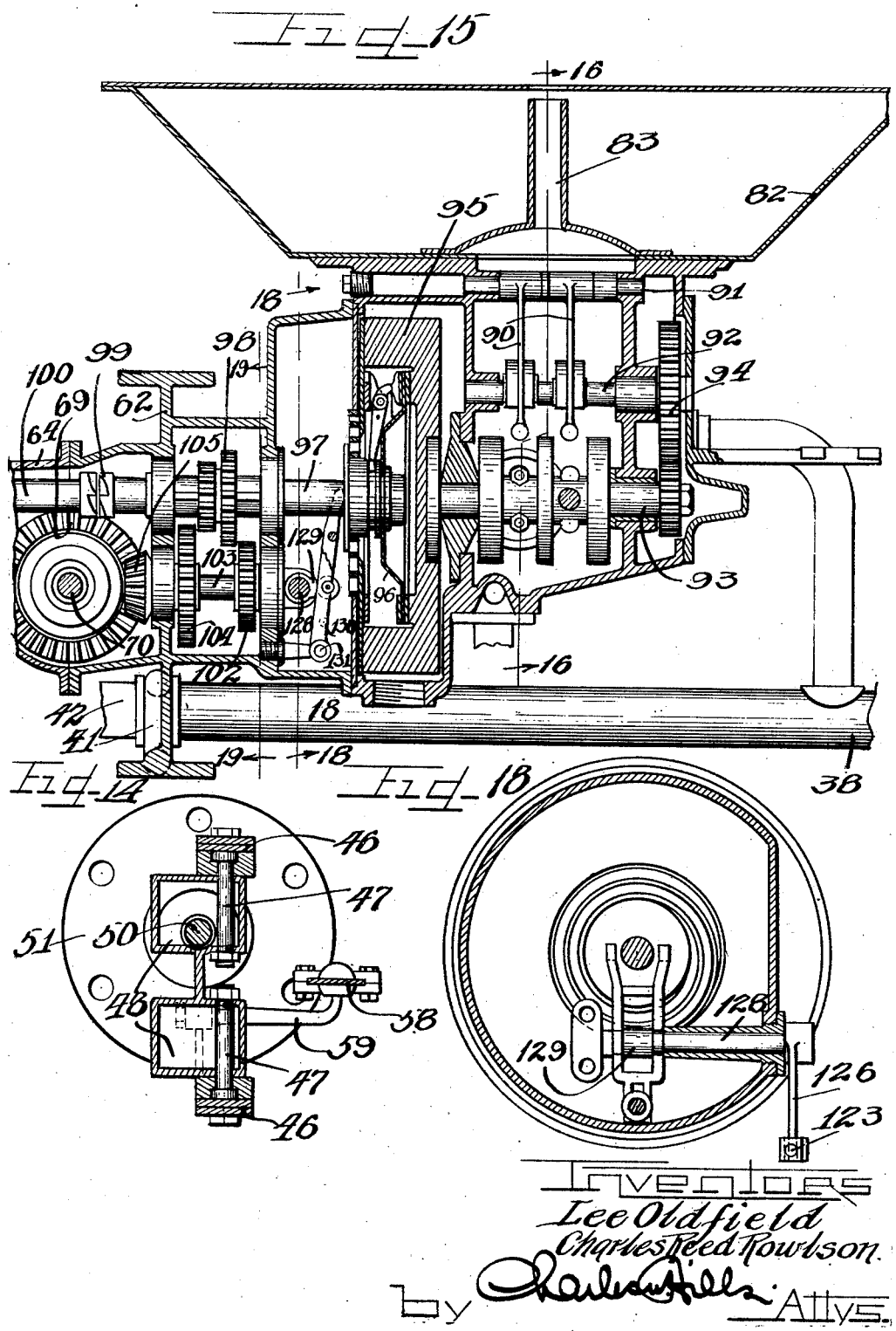

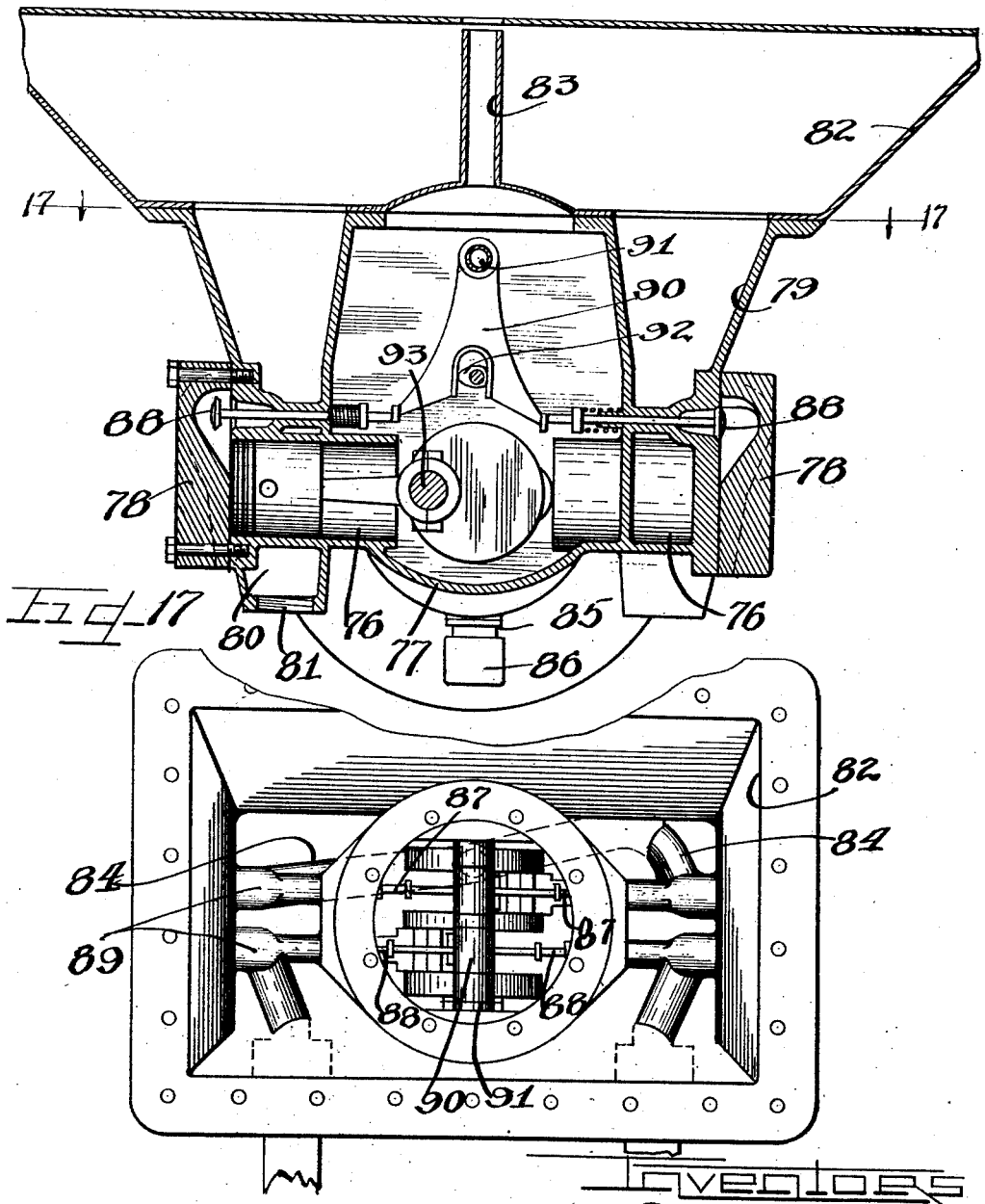

Patented Mar. 26, 1929.

1,706,983

UNITED STATES PATENT OFFICE.

LEE OLDFIELD AND CHARLES REED ROWLSON, OF CHICAGO, ILLINOIS.

MOTOR VEHICLE.

Application filed June 13, 1925. Serial No. 36,830.

This invention relates to automotive vehicles and particularly commercial vehicles for house to house delivery in urban communities.

Heretofore the horse drawn vehicle has been more economical than an automotive vehicle for house to house delivery because of the high cost of the latter vehicles and time lost due to the necessity of the driver entering the vehicle each time it has to be moved to the next point of delivery. Under such circumstances, the superior speed and tirelessness of the ordinary mechanical vehicle does not compensate for the delays in delivery due to the increased labor imposed on the operator. It is therefore an object of this invention to provide an improved system of automotive vehicle control adapted to render the operation of the vehicle as easy as possible, to place the control of the vehicle on a parity with a horse drawn vehicle by permitting the operator to advance the vehicle without entering the same with no more delay than if a driver should grasp the bit or reins to lead a horse to the next point of delivery.

It is also an object of this invention to provide an improved and simplified body structure of a unit construction separated from and attached to the chassis at a minimum number of points to permit rapid removal.

It is a further object of this invention to construct the various parts of the chassis and power plants as individual units readily removable from the vehicle for replacement or repairs. For example, the body may be removed by disconnecting the driving controls and the body brackets, the other elements being unattached thereto; while either the front or the rear assembly may be removed by disconnecting the direct attachments to the body and to the frame. The engine may be removed from beneath the body along with the rear assembly by disconnecting the exhaust pipes and the necessary operating controls.

It is another object of this invention to provide unit assemblies of parts wherein each unit performs a dual purpose in order to simplify the mechanism and greatly reduce the number of parts and the cost of manufacture.

It is also an object of this invention to provide an improved spring and supporting structure wherein the unsprung weight of the axles is reduced to the minimum possible weight involving only the wheels and bearing supports therefor. Such a reduction of unsprung weight also reduces the body weight required to assure easy riding qualities masmuch as the ratio of sprung to unsprung weight for the best spring action is approximately 10 to 1.

It is another object of this invention to provide a double transverse spring mounting adapted to entirely eliminate the ordinary fixed axle and to maintain parallelism between the wheels while permitting entirely independent up and down motion of either wheel.

It is still another object of this invention to provide an improved wheel mounting wherein the ordinary projecting hub and hub cap are eliminated.

It is a further object of this invention to provide an improved chassis frame for an automotive vehicle wherein intermediate loading of the frame is eliminated thus greatly reducing the required rigidity and strength of the frame.

Other and further important objects of this invention will be apparent from the disclosures in the specification and the accompanying drawings.

This invention (in a preferred form) is illustrated in the drawings and hereinafter more fully described.

On the drawings:

Figure 1 is a side elevation of a vehicle embodying the features of this invention.

Figure 2 is a front elevation thereof.

Figure 3 is an enlarged section on the line 3—3 of Figure 2 showing the control mechanism.

Figure 4 is an enlarged section on the line 4—4 of Figure 3 showing part of the control linkage.

Figure 5 is a section on the line 5—5 of Figure 3 showing the chassis parts.

Figure 6 is an end view of the rear axle with parts broken away.

Figure 7 is an enlarged section on the line 7—7 of Figure 6.

Figure 8 is an enlarged section on the line 8—8 of Figure 6.

Figure 9 is an end view of the front axle with parts broken away.

Figure 10 is an enlarged section on the line 10—10 of Figure 9.

Figure 11 is a fragmentary top plan view of the steering gear.

Figure 12 is a section on the line 12—12 of Figure 10.

Figure 13 is a fragmentary top view of one steering knuckle pivot and spring seat assembly.

Figure 14 is an enlarged section on the line 14—14 of Figure 9.

Figure 15 is a section on line 15—15 of Figure 5 along the crankshaft of the engine.

Figure 16 is a section on the line 16—16 of Figure 15.

Figure 17 is a section on the line 17—17 of Figure 16.

Figure 18 is a section on the line 18—18 of Figure 15.

Figure 19 is a section on the line 19—19 of Figure 15.

Figure 20 is a section on the line 20—20 of Figure 19.

Figure 21 is a section on the line 21—21 of Figure 19.

Figure 22 is a section on the line 22—22 of Figure 21.

Figure 23 is a plan view of the gear shift plate or quadrant.

As shown on the drawings:

The type of vehicle shown is that of a commercial delivery truck suitable for repeated stops as in the delivery of commodities such as ice or milk. While this invention is by no means limited to such vehicles used for house to house delivery, the arrangement of the controls brought out hereinafter is especially adaptable for such uses as the movement of the vehicle can be controlled externally of the vehicle so that in making house to house deliveries the driver is not required to enter the vehicle to advance the same if the next point of delivery is but a few doors away.

A body 30 is shown for such service and comprises a floor 31 stepped up at front 32 and rear 33 to provide space thereunder for the respective supporting assemblies. An entry door 34 is provided on each side and for certain classes of services rear doors may be fitted. The body is preferably built up in sections or panels, one or more for each surface, and the panels attached to a framework such as the angle-irons 35 indicated in the figures. Such a construction enables ready replacement of damaged sections as well as greatly simplifying the manufacture of the body. A driver's seat can of course be provided if desired.

The body is supported directly over each supporting assembly by means of brackets 36 and 37 extending from the axle centers to the edges of the body. The depressed portion 31 of the floor between the supporting assemblies is preferably suspended slightly above the chassis frame and for ready removability is preferably not otherwise secured thereto, so that disconnecting the driving control members and the two brackets will allow removal of the body as a whole.

The chassis frame comprises two longitunal members 38 which may be in the form of tubes and which at the front are bolted in sockets 39 in a member 40 forming a spring seat and spacer to which the front body bracket is also fastened. The frame members are also secured in similar sockets or clamps 41 formed on the transmission and differential housing which serves as a spring seat member and spacer and will be described hereinafter. The chassis frame members also serve as exhaust pipes for the engine and are therefore extended rearwardly to form exhaust nozzles 42. It will be evident from the construction of the chassis frame that it is not subject to bending loads except from that due to the weight of the engine partially supported thereon and that the frame is therefore chiefly a tie between the front and rear supporting assemblies, the body being supported at said assemblies. To remove an axle spring and wheel assembly as a unit, it is only necessary to disconnect the two chassis members and block up the body to slide the assembly out from underneath.

The front axle spacing member 40 is provided with spring seat pads 43 at top and bottom and is centrally apertured for the steering wheel shaft 44 which extends up into the body; vertical stiffening webs 45 being provided adjacent the aperture. No axle, as the term is customarily understood, connects the two wheels as laminated springs 46 are bolted to the top and bottom of the spacing member 40 and are directly connected to knuckle pins or king bolts 47 in members forming the equivalent of steering knuckles 48. The front wheel hubs 49 are formed as a part of the knuckles 46 and therefore do not rotate, while the wheel spindles 50 rotate within the hubs and are preferably integral with a wheel disc 51 to which disc wheels 52 may be attached in the usual manner. Such a structure can be made to give center point steering if desired because of the reversal of direction of the wheel spindle.

The springs 46 may be of unequal strength and periods of vibration if desired to dampen out the vibrations of one spring by means of the other spring. The springs are firmly secured to the king bolts, in this way materially stiffening the springs by causing compound flexure thereof as distinguished from the simple flexure of springs secured by shackles. The two springs and the king bolts form parallelograms on either side of the central spacer member 40 and therefore maintain correct alignment of the two wheels irrespective of unequal vertical deflection of the two wheels. Therefore the vehicle can pass over rough ground without weaving of the body and chassis as either wheel can yield or drop to the extent necessary without affecting the other because of the elimination of a rigid axle between the wheels.

The steering mechanism comprises a bracket 53 secured to the spacing member 40 and apertured for a rack 54 which is preferably tubular with rack teeth extending at least partially around its circumference to permit oscillation of the rack respective to the bracket because of the general flexibility of the front axle system. A gear 54ª on the end of the steering wheel shaft meshes with the rack to cause movement thereof. Tie bars 55, engaging each end of the rack, meet to form a ball socket 56 bolted about a ball ended stud 57 secured in a flexible or spring tie and connecting rod 58 having ball sockets at its ends engaging balls on steering knuckle arms 59 extending from the steering knuckles. The tie rod 58 is not intended to be longitudinally yielding but to offer little resistance to the movement of individual wheels. The whole steering mechanism can be removed from the chassis by disconnecting two ball joints and removing the bracket 53. The elimination of a drag link results in the elimination of steering troubles due to spring flexure.

The rear assembly is constructed on principles similar to the front axle, the upper and lower cross springs 60 and 61 seating on brackets 62 and 63 formed on the differential housing 64 and being fixed at their outer ends to spacer members 65 forming a dust cover for an internal gear 66 forming a part of the rear wheel hubs 67, a spur gear 68 being supported in a boss on the member 65.

The differential housing 64 contains the usual bevel gear and differential assembly 69 with stud shafts 70 terminating in universal joints 71, the shafts also carrying brake drums 72. A short shaft 73 connects the universal joints 71 to a second joint 74 secured to the spur gear 68 engaging the wheel gear 66. Such a flexible connection is desirable because of the elimination of an axle housing tying the two wheels together, and it permits either rear wheel to move independently of the other. The wheel loads are transferred to the springs spacer members 65 through a wheel spindle 75 attached to the wheel hub and suitably journalled in the hub member 67.

The power plant comprises a water-cooled two cylinder horizontal opposed engine, the cylinders 76 of which may be integral with the crankcase 77 and may have either water or air cooled cylinder heads 78. The water jacket 79 extends about that part of the cylinder barrels exposed to the products of combustion and terminates below in a deep pocket 80 having a drain opening 81 large enough to remove scale as well as to drain the water. A flaring water hopper 82 is secured to the top of the crankcase and water jackets, a crankcase breather pipe 83 extending to the top of the hopper. Inlet passages 84 may be cored in the crankcase leading to a flanged connection 85 at the bottom of the crankcase, a carbureter 86 being secured thereto. The valve mechanism comprises inlet and exhaust valves 87 and 88 arranged in parallel valve pockets 89 and actuated by suitable mechanism including rocker arms 90, pivoted on a rocker shaft 91 and a camshaft 92 above the crankshaft 93, and driven therefrom by the gearing 94. The flywheel 95 carries a single plate clutch 96 connected to the transmission shaft 97 which carries the sliding speed change gears 98 and a jaw clutch 99 adapted to be engaged by a starting crank shaft 100 projecting clear of the differential housing.

The transmission includes a two speed and reverse sliding gear mechanism, the double gear 98 sliding forward on the shaft 97 to engage a high speed gear 102 on a stub shaft 103 and sliding rearwardly to engage a low speed gear 104 on the same shaft which carries a bevel gear 105 meshing with the differential ring gear. Reverse rotation of the final drive is accomplished with the sliding double gear 98 in neutral position by oscillating a double width idler gear 106 to bring one side of said gear into mesh with one of the sliding gears while the other side of said idler gear meshes with the low speed gear 104. Oscillation of the double idler gear 106 is accomplished by mounting it on a crank shaft 107 having a pinion 108 pinned thereto and engaging a vertically movable rack 109 to oscillate the gear 106 about the axis of the pinion 108.

The transmission speed changes and reverse is accomplished by a single lever 110 convenient to the driver and having a rocking motion in a plane transverse to the body and a bodily movement fore and aft of the body, the lever being connected to a shaft 111 journalled beneath the body and terminating in a double ended lever 112 having a ball end 113 engaging a shifting lever 114 adapted to shift the sliding double gear 101 to provide the two forward speeds when the lever 110 is moved fore and aft. The other end 115 of the double lever 112 engages within a U-shaped member 116 secured to the vertically movable rack 109 which controls the reverse idling gears. A guide plate 110ª is bolted to the transmission housing and engages about the lever 112 adjacent the end 115 thereof and serves to constrain the reverse gear engagement to a position wherein the sliding double gear 98 is positively held in neutral position.

The clutch and brake control comprises a cross shaft 117 mounted below the steering wheel and having levers 118 at either side of the body adjacent the doors so that the operator may reach them from either side without entering the vehicle if he desires to move it a few feet either way. The cross shaft 117 is connected to a rocker shaft 119 by a pair of levers 120 and rods 121 leading to bell cranks 122 on the rocker shaft. Rods 123 and 124 connected to the bell cranks lead to brake band mechanisms 125 surrounding the brake drums on the differential shafts; a rearward movement of the levers 118 serving to apply the brakes. The rod 123 terminates short of the brake mechanism and engages a clutch operating lever 126, a short rod 127 extending from this pin joint to the brake mechanism. The clutch lever 126 turns a cross shaft 128 on which is mounted a cam 129 operating the clutch throw out fork 130 which is pivoted at 131 within the transmission case. In the operation of the controls, a forward movement of either clutch and brake lever 118 allows engagement of the clutch for movement of the vehicle, while rearward movement thereof disengages the clutch and applies the brakes on the rear assembly. The neutral position allows coasting for example with the clutch disengaged and the brakes free. In effect this gives a control of the vehicle closely resembling that of an electric truck together with the advantage of independence of a charging station and lower first cost and attendance of an internal combustion engine power plant.

We are aware that many changes may be made and numerous details of construction may be varied through a wide range without departing from the principles of this invention and we therefore do not purpose limiting the patent granted hereon otherwise than necessitated by the prior art.

We claim as our invention:

1. In an automotive vehicle, front and rear axle units each comprising a pair of parallel cross springs, a central spacer for the front pair, a power unit and transmission forming the spacer for the rear pair, and wheel mountings rigidly secured to the ends of the springs to maintain the parallelism of said springs.

2. In an automotive vehicle, front and rear axle units each comprising a pair of parallel cross springs, a central spacer for the front pair, a power unit and transmission forming the spacer for the rear pair, and means independent of a vehicle body adapted to maintain parallelism between said front and rear axle units.

3. In an automotive vehicle, front and rear axle units comprising parallel cross springs, central spacers to which the springs are secured, wheel mountings forming spacers for the ends of the springs, and means for immovably securing said spring ends to said wheel mountings.

4. An axle for vehicles comprising parallel spaced springs, a spacer member having the centers of said springs secured thereto, wheel mountings adapted to serve as spacers for the ends of said springs, and means adapted to rigidly secure said spring ends to said wheel mountings.

In testimony whereof, we have hereunto subscribed our names.

LEE OLDFIELD.
CHARLES REED ROWLSON.